(12) United States Patent
Park et al.

(10) Patent No.: US 8,705,715 B2
(45) Date of Patent: Apr. 22, 2014

(54) HOME APPLIANCE, HOME APPLIANCE SYSTEM, AND DIAGNOSIS METHOD OF A HOME APPLIANCE

(75) Inventors: Hyung Jun Park, Changwon-si (KR); Hae Yong Kang, Changwon-si (KR); Young Soo Kim, Changwon-si (KR); Si Moon Jeon, Changwon-si (KR); Koon Seok Lee, Changwon-si (KR); Yong Tae Kim, Changwon-si (KR); Hyun Sang Kim, Changwon-si (KR); Eui Hyeok Kwon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 723 days.

(21) Appl. No.: 12/432,111

(22) Filed: Apr. 29, 2009

(65) Prior Publication Data

US 2010/0027770 A1    Feb. 4, 2010

Related U.S. Application Data

(60) Provisional application No. 61/049,201, filed on Apr. 30, 2008.

(30) Foreign Application Priority Data

Apr. 30, 2008  (KR) ........................ 10-2008-0040677
Apr. 10, 2009  (KR) ........................ 10-2009-0031499
Apr. 29, 2009  (KR) ........................ 10-2009-0037436

(51) Int. Cl.
*H04M 11/00* (2006.01)

(52) U.S. Cl.
USPC .............. 379/106.01; 379/106.7; 379/106.11; 379/102.01; 379/102.07

(58) Field of Classification Search
USPC ............. 379/106.01, 106.07, 106.11, 102.01, 379/102.07, 102.04, 93.37, 37, 90.01, 9.04, 379/92.01, 92.03, 92.04; 340/53, 679, 340/310.06, 310.08, 539.24, 853.2
See application file for complete search history.

(56) References Cited

U.S. PATENT DOCUMENTS 3,910,322 A * 10/1975 Hardesty et al. ................ 714/25
4,146,754 A    3/1979 Rose
(Continued)

FOREIGN PATENT DOCUMENTS

CN    1212304    3/1999
CN    1393672    1/2003
(Continued)

OTHER PUBLICATIONS

Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).

(Continued)

*Primary Examiner* — Vivian Chin
*Assistant Examiner* — Leshui Zhang
(74) *Attorney, Agent, or Firm* — Ked & Associates LLP

(57) ABSTRACT

A home appliance system and an operation method thereof are disclosed. The home appliance outputs product information as a predetermined sound and transmits the sound through a connected communication network, thereby making it easier for a service center at a remote place to check a status of the home appliance. Further, the home appliance system and operation method thereof prevents noise or signal error generated in the procedure of converting product information into a signal of a predetermined frequency band in order to output the product information as a sound, thus enabling stable signal conversion and improving the accuracy of information transmission using the output of sound.

21 Claims, 8 Drawing Sheets

(56) References Cited

U.S. PATENT DOCUMENTS

| | | | |
|---|---|---|---|
| 4,766,505 A | 8/1988 | Nakano et al. | |
| 4,897,659 A | 1/1990 | Mellon | |
| 4,977,394 A | 12/1990 | Manson et al. | |
| 5,103,214 A | 4/1992 | Curran et al. | |
| 5,210,784 A | 5/1993 | Wang et al. | |
| 5,268,666 A | 12/1993 | Michel et al. | |
| 5,452,344 A * | 9/1995 | Larson | 340/538.11 |
| 5,506,892 A | 4/1996 | Kojima et al. | |
| 5,664,218 A | 9/1997 | Kim et al. | |
| 5,757,643 A | 5/1998 | Kuroda et al. | |
| 5,774,529 A | 6/1998 | Johannsen et al. | |
| 5,864,828 A | 1/1999 | Atkins | |
| 5,939,992 A | 8/1999 | Devries et al. | |
| 5,940,915 A | 8/1999 | Nam | 8/159 |
| 5,987,105 A * | 11/1999 | Jenkins et al. | 379/106.01 |
| 6,121,593 A | 9/2000 | Mansbery et al. | |
| 6,759,954 B1 | 7/2004 | Myron et al. | |
| 6,763,458 B1 | 7/2004 | Watanabe et al. | 713/100 |
| 6,778,868 B2 | 8/2004 | Imamura et al. | |
| 6,870,480 B2 | 3/2005 | Suzuki et al. | |
| 6,906,617 B1 | 6/2005 | Van der Meulen | |
| 7,135,982 B2 | 11/2006 | Lee | 340/635 |
| 7,243,174 B2 | 7/2007 | Sheahan et al. | |
| 7,266,164 B2 | 9/2007 | Jeon et al. | |
| 7,280,643 B2 | 10/2007 | Howard et al. | 379/93.37 |
| 7,337,457 B2 | 2/2008 | Pack et al. | 725/40 |
| 7,363,031 B1 | 4/2008 | Aisa | |
| 7,439,439 B2 | 10/2008 | Hayes et al. | 84/600 |
| 7,509,824 B2 | 3/2009 | Park et al. | 68/12.23 |
| 7,631,063 B1 | 12/2009 | Ho et al. | |
| 7,648,476 B2 | 1/2010 | Bock et al. | |
| 7,653,512 B2 | 1/2010 | Cheung et al. | 702/184 |
| 7,750,227 B2 | 7/2010 | Hayes et al. | |
| 7,843,819 B1 | 11/2010 | Benveniste | |
| 7,965,632 B2 | 6/2011 | Sugaya | |
| 8,027,752 B2 | 9/2011 | Castaldo et al. | |
| 8,040,234 B2 | 10/2011 | Ebrom et al. | 340/531 |
| 8,045,636 B1 | 10/2011 | Lee et al. | |
| 8,132,049 B2 | 3/2012 | Yasukawa et al. | |
| 8,204,189 B2 | 6/2012 | Rhodes et al. | |
| 8,325,054 B2 | 12/2012 | Kim et al. | |
| 8,391,255 B2 | 3/2013 | Ribiere et al. | |
| 8,428,910 B2 | 4/2013 | Papadimitriou et al. | |
| 2002/0029575 A1 | 3/2002 | Okamoto | |
| 2002/0032491 A1 | 3/2002 | Imamura et al. | |
| 2002/0078742 A1 | 6/2002 | Kim | 73/162 |
| 2002/0097161 A1 | 7/2002 | Deeds | |
| 2002/0116959 A1 | 8/2002 | Ohta et al. | |
| 2002/0120728 A1 | 8/2002 | Braatz et al. | |
| 2003/0028345 A1 | 2/2003 | Watkins et al. | |
| 2003/0110363 A1 | 6/2003 | Bachot et al. | |
| 2003/0128850 A1 | 7/2003 | Kimura et al. | |
| 2003/0167782 A1 | 9/2003 | Roh et al. | |
| 2003/0196492 A1 | 10/2003 | Remboski et al. | 73/593 |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0211228 A1 | 10/2004 | Nishio et al. | |
| 2004/0249903 A1 | 12/2004 | Ha et al. | |
| 2004/0261468 A1 | 12/2004 | Lueckenbach | |
| 2005/0015890 A1 | 1/2005 | Kim et al. | |
| 2005/0029976 A1 | 2/2005 | Terry et al. | |
| 2005/0086979 A1 | 4/2005 | Son et al. | |
| 2005/0129200 A1 | 6/2005 | Forrest et al. | 379/93.37 |
| 2005/0134472 A1 | 6/2005 | Jang et al. | |
| 2005/0162909 A1 | 7/2005 | Wooldridge | |
| 2006/0048405 A1 | 3/2006 | Baek et al. | |
| 2006/0066758 A1 | 3/2006 | Higashihara | |
| 2006/0089818 A1 | 4/2006 | Norell et al. | |
| 2006/0136544 A1 | 6/2006 | Atsmon et al. | |
| 2006/0168740 A1 | 8/2006 | Ha et al. | |
| 2006/0259199 A1 | 11/2006 | Gjerde et al. | |
| 2007/0113595 A1 | 5/2007 | Harwood et al. | |
| 2007/0137265 A1 | 6/2007 | Shikamori et al. | |
| 2007/0175883 A1 | 8/2007 | Miu et al. | |
| 2007/0189323 A1 | 8/2007 | Swoboda et al. | |
| 2007/0219756 A1 | 9/2007 | Frankel et al. | |
| 2007/0272286 A1 | 11/2007 | Curtius et al. | |
| 2008/0036619 A1 | 2/2008 | Rhodes et al. | |
| 2008/0072383 A1 | 3/2008 | Bextermoller et al. | |
| 2008/0122648 A1 | 5/2008 | Ebrom et al. | |
| 2009/0067102 A1 | 3/2009 | Cline et al. | |
| 2009/0160637 A1 | 6/2009 | Maeng | |
| 2009/0169434 A1 | 7/2009 | Ogusu | |
| 2009/0282308 A1 | 11/2009 | Gutsche et al. | |
| 2009/0323914 A1 | 12/2009 | Lee et al. | |
| 2010/0037401 A1 | 2/2010 | Bae et al. | |
| 2010/0116060 A1 | 5/2010 | Murayama | 73/593 |
| 2011/0022358 A1 | 1/2011 | Han et al. | |
| 2011/0060553 A1 | 3/2011 | Han et al. | |
| 2011/0200189 A1 | 8/2011 | True et al. | |

FOREIGN PATENT DOCUMENTS

| | | |
|---|---|---|
| CN | 1497915 | 5/2004 |
| CN | 1606282 | 4/2005 |
| CN | 101202639 | 6/2008 |
| EP | 0 038 687 | 10/1981 |
| EP | 0510519 | 10/1992 |
| EP | 0 617 557 A2 | 9/1994 |
| EP | 0 742 308 | 11/1996 |
| EP | 0 846 991 | 6/1998 |
| EP | 0 851 054 | 7/1998 |
| EP | 0691060 | 5/2004 |
| JP | 04-241563 | 8/1992 |
| JP | 4-358497 | 12/1992 |
| JP | 07-239176 | 9/1995 |
| JP | 10-133767 | 5/1998 |
| JP | 11-127254 | 11/1999 |
| JP | 2001-345949 | 12/2001 |
| JP | 2001-353395 | 12/2001 |
| JP | 2002-000988 | 1/2002 |
| JP | 2002-011274 | 1/2002 |
| JP | 2002-031471 | 1/2002 |
| JP | 2002-045590 A | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 | 10/2007 |
| JP | 2008-003562 | 1/2008 |
| KR | 10-1991-0020404 A | 12/1991 |
| KR | 10-1996-0003308 A | 1/1996 |
| KR | 10-1997-0019443 A | 4/1997 |
| KR | 10-0127232 | 10/1997 |
| KR | 10-0143209 B1 | 8/1998 |
| KR | 20-1999-0040564 U | 12/1999 |
| KR | 20-0162050 B1 | 12/1999 |
| KR | 10-2000-0018678 | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-2004-0050767 | 6/2004 |
| KR | 10-2004-0095017 | 11/2004 |
| KR | 10-2004-0103352 | 12/2004 |
| KR | 10-2005-0062747 A | 6/2005 |
| KR | 10-2005-0097282 A | 10/2005 |
| KR | 10-0564761 B1 | 3/2006 |
| KR | 10-2006-0103014 | 9/2006 |
| KR | 10-0641974 B1 | 11/2006 |
| KR | 10-2007-0013090 | 1/2007 |
| KR | 10-2008-0068447 | 7/2008 |
| KR | 10-0887575 B1 | 3/2009 |
| KR | 10-2010-0112950 | 10/2010 |
| KR | 10-2011-0010378 | 2/2011 |
| WO | WO 01/11575 | 2/2001 |

(56) References Cited

FOREIGN PATENT DOCUMENTS

WO    WO 2005/106096    11/2005
WO    WO 2008/010670    1/2008

OTHER PUBLICATIONS

European Search Report dated Oct. 14, 2011 issued in Application No. 09 73 8950.
International Search Report dated Dec. 1, 2010 (PCT/KR2010/002211).
International Search Report dated Dec. 1, 2010 (PCT/KR2010/002222).
International Search Report dated Apr. 25, 2011 issued in Application No. PCT/KR 2010/004407.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
International Search Report dated Dec. 18, 2009.
International Report dated Dec. 21, 2009.
International Search Report dated Jan. 4, 2010.
PCT International Search Report dated May 26, 2011 issued in Application No. PCT/KR2010/005108.
International Search Report dated Aug. 23, 2010 (Application No. PCT/KR2010/000319).
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Office Action issued in U.S. Appl. No. 12/431,903 dated Jan. 2, 2013.
U.S. Notice of Allowance issued in U.S. Appl. No. 12/847,303 dated Jan. 11, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
Japanese Office Action dated Sep. 11, 2012.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
European Search Report dated Dec. 17, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
International Search Report issued in Application No. PCT/KR2011/000311 dated Jul. 28, 2011.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Russian Office Action issued in Application No. 2010144513/08 dated Jun. 27, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Korean Office Action dated Aug. 13, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
European Search Report dated Jan. 2, 2013.
Ethem M Sözer; "Simulation and Rapid Prototyping Environment for Underwater Acoustic Communications: Reconfigurable Modem"; OCEANS—Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,339 dated Sep. 6, 2013.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
U.S. Appl. No. 12/431,893, filed Apr. 29, 2009.
U.S. Appl. No. 12/431,903, filed Apr. 29, 2009.
U.S. Appl. No. 12/431,910, filed Apr. 29, 2009.
U.S. Appl. No. 12/432,132, filed Apr. 29, 2009.
U.S. Appl. No. 12/551,827, filed Sep. 1, 2009.

(56) References Cited

OTHER PUBLICATIONS

U.S. Appl. No. 12/757,339, filed Apr. 9, 2010.
U.S. Appl. No. 12/568,022, filed Sep. 28, 2009.
U.S. Appl. No. 12/757,205, filed Apr. 9, 2010.
U.S. Appl. No. 12/757,213, filed Apr. 9, 2010.
U.S. Appl. No. 12/757,232, filed Apr. 9, 2010.
U.S. Appl. No. 12/757,246, filed Apr. 9, 2010.
U.S. Appl. No. 12/603,810, filed Oct. 22, 2009.
U.S. Appl. No. 12/432,184, filed Apr. 29, 2009.
U.S. Appl. No. 13/382,334, filed Jan. 5, 2012.
U.S. Appl. No. 12/842,649, filed Jul. 23, 2010.
U.S. Appl. No. 12/842,679, filed Jul. 23, 2010.
U.S. Appl. No. 12/846,013, filed Jul. 29, 2010.
U.S. Appl. No. 12/846,040, filed Jul. 29, 2010.
U.S. Appl. No. 12/847,272, filed Jul. 30, 2010.
U.S. Appl. No. 12/847,303, filed Jul. 30, 2010.
U.S. Appl. No. 12/847,406, filed Jul. 30, 2010.
U.S. Appl. No. 12/847,284, filed Jul. 30, 2010.
U.S. Appl. No. 12/847,306, filed Jul. 30, 2010.
U.S. Appl. No. 12/850,240, filed Aug. 4, 2010.
U.S. Appl. No. 13/522,066, filed Jul. 13, 2012.
U.S. Appl. No. 13/562,704, filed Jul. 31, 2012.
U.S. Appl. No. 13/588,164, filed Aug. 17, 2012.
Korean Notice of Allowance dated Aug. 30, 2013.
U.S. Office Action issued in U.S. Appl. No. 12/842,649 dated Oct. 8, 2013.
Chinese Office Action dated Oct. 10, 2013.
U.S. Notice of Allowance issued in U.S. Appl. No. 12/846,013 dated Nov. 5, 2013.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.

\* cited by examiner (a)

(b)

(a)

(b)

(a)

(b)

HOME APPLIANCE, HOME APPLIANCE SYSTEM, AND DIAGNOSIS METHOD OF A HOME APPLIANCE

This application claims priority to U.S. Provisional Application No. 61/049,201, filed Apr. 30, 2008, Korean Patent Application No. 10-2008-0040677 filed in Korea on Apr. 30, 2008, Korean Patent Application No. 10-2009-0031499 filed in Korea on Apr. 10, 2009 and Korean Patent Application No. 10-2009-0037436 filed in Korea on Apr. 29, 2009 which are hereby incorporated by reference.

BACKGROUND

1. Field

The present invention relates to a home appliance system and an operation method thereof, and more particularly, to a home appliance system and an operation method thereof which can check a status of a home appliance and provide for convenient after-sales service by analyzing product information contained in a sound by the use of the sound output from the home appliance.

2. Discussion of the Related Art

Home appliances store settings for executing operations, information generated during operation, fault information, and so forth during the execution of a predetermined operation. Especially in the case of failure, the home appliance allows a user using the home appliance to recognize a status of the home appliance by outputting a predetermined alarm. As well as simply notifying the user of completion of an operation or a failure occurrence, such a home appliance outputs detailed fault information through output means provided therein, for example, display means, a lamp, etc.

If any abnormality occurs to the home appliance, the user will have to use the after-sales service to contact a service center or the like for advice on the status of the home appliance or ask for service personnel to look at the faulty home appliance.

However, it usually happens that fault information is output for no reason or output in code values that the user does not know about, thus making it difficult for the user to cope with the failure of the home appliance. Even if the user contacts the service center, it will be difficult for the user to explain exactly what status the home appliance is in. Owing to this, if service personnel visit a home, it often takes a lot of time and cost to repair the home appliance since he or she has not given a proper explanation of the status of the home appliance beforehand. For example, if parts required for repairing the home appliance are not ready in advance, the service personnel will have to bother to come again, and that much time is required.

To overcome this problem, a home appliance and a server of a service center may be connected through a predetermined communication means, but this leads to the problem of having to construct a communication network.

In addition, with the progress of the technologies, there has been developed a technique for remotely diagnosing fault information or the like by using a telephone network.

Application No. EP0510519 discloses a technique for transmitting fault information of a home appliance to a service center through a modem connected to the home appliance by using a telephone network. In this case, there was a problem that the modem had to be connected to the home appliance. In particular, home appliances such as a laundry treatment machine are usually installed outdoors, and therefore limitations on place are needed in order to connect the laundry treatment machine and the telephone network.

U.S. Pat. No. 5,987,105 discloses a technique for converting fault information of a home appliance into a sound of an audible frequency band and transmitting this sound to a service center or the like. During the procedure of transmitting the sound to the receiver of a handset after converting the fault information of the home appliance into the sound of the audible frequency band, a signal interference may occur according to the surrounding environment. Also, during the procedure of transmitting the sound through a telephone network, a data loss may occur depending on the characteristics of the telephone network.

In the above-mentioned U.S. Pat. No. 5,987,105, the size of one symbol representing one bit, which is one unit of information, should be 30 ms, and each individual frequency is used for each bit, in order to prevent data loss and transmit exact information of the product.

To minimize the intervals at which the same frequency is repeated, frequencies corresponding to the number of data have to be used. To represent seven data, seven different frequencies have to be used. Thus, there arises the problem of using unnecessarily many frequencies.

Moreover, to solve the problem caused by the use of multiple frequencies, the size of a symbol has to be increased in order to reduce the number of frequencies used. This leads to a problem that a conventional symbol time of 30 ms increases to greater than 100 ms. In this case, the size of data to be transmitted also increases owing to the large size of the symbol, and accordingly the transmission time also increases.

Subsequently, there is a demand for an alternative that represents product information by a fewer number of frequencies, reduces overall size and transmission time by using a short symbol time, and improves accuracy in a short symbol time.

SUMMARY OF THE INVENTION

It is an object of the present invention to provide a home appliance system and an operation method thereof in a home appliance and home appliance system for converting a control signal containing product information into an acoustic signal and externally outputting a sound corresponding to the acoustic signal, which can improve frequency use efficiency by reducing the number of frequencies used for signal conversion, reduce overall size and transmission time by decreasing the size of a symbol time, which is a unit of information, and improve the accuracy and efficiency of diagnosis of a status of the home appliance using sound by preventing a noise or signal error generated during the conversion of an acoustic signal.

Accordingly, there is provided a home appliance system according to the present invention, which transmits product information of the home appliance to a management device through a wired/wireless communication network for the purpose of fault diagnosis, the home appliance comprising: a selection device for receiving an input of a command to allow a user to perform fault diagnosis; a controller provided with a storage device for storing the product information of the home appliance for fault diagnosis, and loading the product information stored in the storage device and outputting a control signal when fault diagnosis is selected through the selection device; a conversion device that converts the control signal which may include product information into an acoustic signal and outputs the at least one acoustic signal; and an output device for receiving an input of the acoustic signal and outputting a corresponding sound, wherein the controller enters into a smart diagnosis mode upon receipt of a command from the selection device to form the product information in a combination of a plurality of symbols having a given size of symbol time, generates a control signal by setting a dead time between symbols, and controls such that the acoustic signal is output through the output device.

Additionally, there is provided a home appliance system according to the present invention, which transmits product information of the home appliance to a management device through a wired/wireless communication network for the purpose of fault diagnosis, the home appliance including: a selection device for receiving an input of a command to allow a user to perform fault diagnosis; a controller provided with a storage device for storing the product information of the home appliance for fault diagnosis, and loading the product information stored in the storage device and outputting a control signal when fault diagnosis is selected through the selection device; a conversion device for generating an acoustic signal in response to the control signal of the controller and an output device for receiving an input of the acoustic signal and outputting a corresponding sound, wherein the controller generates the control signal by setting 1 bit, which is a basic unit in which the product information has a predetermined data value, as one symbol and setting a symbol time such that the sound is to be transmitted at a transmission rate higher than 20 and at an error rate smaller than the error rate at which 30 errors occur per 1216 bits.

Additionally, there is provided an operation method of a home appliance system according to the present invention, in a signal outputting method for the home appliance system, including: storing product information containing operation information and fault information of a home appliance; when a command for allowing the home appliance to enter into a smart diagnosis mode is inputted, invoking the product information to set a basic unit of data of the product information as a symbol and generating a control signal by setting a dead time between symbols; and converting the control signal into an acoustic signal of a predetermined frequency band and outputting the acoustic signal as a predetermined sound.

In the thus-configured home appliance system and operation method thereof according to the present invention, since no signal conversion takes place during an interval during which a data value changes in the procedure of converting product information into sound, a noise or signal error generated during signal conversion is prevented, and a stable signal conversion and an accurate sound output is enable, thereby making it easy to transmit information through sound and hence making it convenient to use an after-sales service by checking and diagnosing a status of the home appliance in the system through a communication network. Further, by reducing symbol time while using a fewer number of frequencies, fault information and status information can be output at a high speed even if an output device having a narrow frequency bandwidth is used, and therefore transmission time can be reduced.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Hereinafter, an exemplary embodiment of the present invention will be described in detail with reference to the accompanying drawings.

Figure 1:
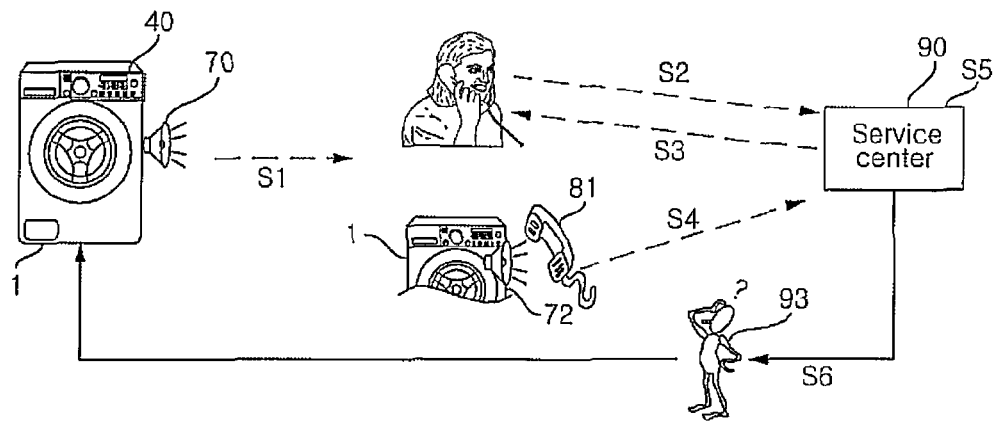
FIG. 1 is a schematic diagram of a home appliance system in the form of a laundry treatment according to an embodiment.

FIG. 1 is a schematic diagram of a home appliance system in the form of a laundry treatment according to an embodiment. Referring to FIG. 1, a home appliance system is configured such that when information about an operation of a home appliance is output in sound from the home appliance 1 at home, a sound signal containing product information through a telephone network is transmitted to a service center 90 to diagnose the presence or absence of a fault in the status of the home appliance.

The home appliance 1 is provided with a display device 40 for displaying a predetermined data and an output device 70 serving as means for outputting sound to output an operational state, fault information, and so on of the home appliance 1 (S1).

The display device 40 of the home appliance is a light emitting element, such as an LED, an LCD, and an organic EL, and visualizes and displays the status information or fault information of the home appliance 1. The output device 70 reproduces and outputs the status information or fault information in an acoustic form.

When the home appliance 1 fails during operation, the home appliance 1 notifies the user of a failure occurrence through the display device 40 or the output device 70.

At this time, the user checks the product information of the home appliance 1 displayed on the display device 40 of the home appliance and controls the operation of the home appliance 1, or asks the service center 90 for repair (S2). The user contacts the service center 90 to notify them of the failure occurrence and inquire about actions to be taken.

In the case where the user connects to the service center 90 and manipulates input device 20 provided in the home appliance 1 according to an instruction from the service center 90 (S3), a sound containing the product information is output (S4). The home appliance 1 of the present invention does not merely output the product information but also converts the product information and outputs it as a predetermined sound.

At this time, the user can ask for an after-sales service for the home appliance 1 by transmitting a sound containing the product information of the home appliance by means of his or her mobile terminal or telephone handset while being on the phone (S2, S3) by holding the telephone handset 81 to the portion of the home appliance 1 from which the sound is coming, while notifying model information and fault symptoms of the home appliance 1.

Upon receipt of the sound through the connected communication network, the service center 90 can identify the product status of the home appliance 1 by checking the sound (S5).

When the user connects to the service center 90 through a communication network, for example, a telephone network, the service center checks the sound output from the home appliance 1 to determine the product status of the home appliance 1 (S5).

In response to the diagnosis result, the service center 90 sends service personnel 93 to the user's house to provide an appropriate service for the product status and diagnosed fault of the home appliance (S6). At this time, the diagnosis result may be transmitted (S6) to the terminal of the service technician 93 so that the service technician 93 can correct the fault of the home appliance 1, or may be delivered to the user through helpline. Also, the diagnosis result may be delivered to the user's email or transmitted to the user's mobile terminal.

Therefore, when the user connects to the service center through a predetermined communication network, for example, a telephone network, to the service center, the system can determine the status of the home appliance 1 by sound and cope with this, thus enabling a rapid service offering.

The following description will be given of an example in which the home appliance of the present invention 1 is a laundry treatment machine, but it should be noted that the present invention is not limited thereto and applicable to the whole range of home appliances 1, such as a TV, an air conditioner, a washing machine, a refrigerator, a rice cooker, a microwave oven, and so forth.

Such a home appliance 1 is configured as follows to output product information as a predetermined sound.

Figure 2:
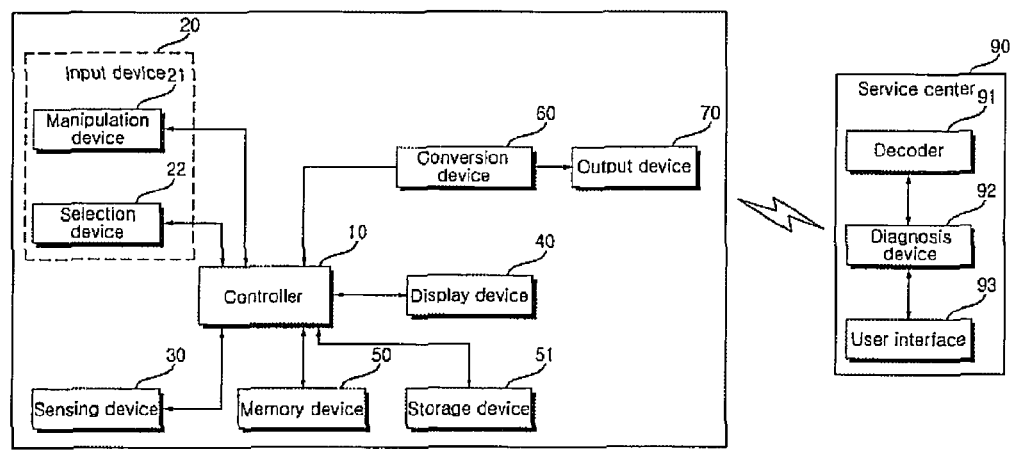
FIG. 2 is a block diagram of a home appliance system in the form of a laundry treatment machine according to an embodiment.

FIG. 2 is a block diagram of a home appliance system in the form of a laundry treatment machine according to an embodiment. Referring to FIG. 2, the home appliance 1 comprises an input device 20, a sensing device 30, a memory device 50, a conversion device 60, an output device 70, and a controller 10 for controlling the overall operations of the home appliance.

The home appliance may further comprise a driving device for controlling the driving of the home appliance 1 so that the home appliance 1 can execute a predetermined operation in response to a control signal applied from the controller 10.

For example, in the case of a laundry treatment machine, the driving device drives a motor rotating a washing tub or drum and controls the operation of the motor so that the washing tub or drum rotates to remove contaminants from the laundry. Also, in response to the control signal from the controller 10, the driving device controls a valve so as to execute water supply or drainage.

The sensing device 30 may include at least one sensor (not shown), and measures data for checking an operational state of the home appliance 1 and apply the data to the controller 10 when the home appliance 1 executes a operation by means of the driving device 40. For example, in the laundry treatment machine, the sensing device 30 measures a water level at the time of water supply or drainage, and measures a temperature of supplied water, a rotation speed of the washing tub or drum, and so on.

The memory device 50 may store operation information, such as operational state data generated during operation and setting data input by a manipulation device 21 to allow the home appliance 1 to execute a predetermined operation, during the execution of a predetermined operation by the home appliance 1, and store fault information containing information about the cause of a malfunction or a malfunction region in the case of malfunction of the home appliance 1.

Also, the memory device 50 may store control data for controlling an operation of the home appliance 1 and default data used at the time of operation control.

At this time, the memory device 50 may include all data storage means, such as an ROM storing control data on the home appliance, an EEPROM, and a storage area storing processed data. The storage device 51 is storage means of the controller 10. The storage device 51 is included in the memory device 50.

The input device 20 may be input means for inputting a predetermined signal or data into the home appliance by a user's manipulation, a button, a switch, and a touch pad can be used as the input device 20, and the input device 20 may include a manipulation device 21 and a selection device 22.

The selection device 22 may include at least one input means, and select and input access to the smart diagnosis mode.

When the access to the smart diagnosis mode is selected and input, the selection device 22 may apply a signal output command to the controller 10 so as to output product information as a predetermined sound through the output device 70.

In addition, as the access to the smart diagnosis mode is made, the selection device 22 may turn the output device 70 on and off. That is, when a signal output command is input by the selection device 22, product information is output as a sound in response to the controlling of the controller 10 and, whereupon the output device 70 is operated to output the sound.

The manipulation device 21 may receive an input of data, such as an operation course and operational settings and apply it to the controller 10.

Also, the manipulation device 21 may receive an input of settings according to the sound output. That is, the manipulation device 21 receives an input of setting values for setting a sound outputting method and the volume of an output sound.

At this time, the input device 20, such as the selection device 22 and the manipulation device 21, may be formed as a button, a dome switch, a touch pad (static pressure/static electricity), a jog wheel, a jog switch, a finger mouse, a rotary switch, a jog dial, and so forth. Any device that generates a predetermined input data by a manipulation is applicable.

When a signal corresponding to the access to the smart diagnosis mode is input from the selection device 22, the controller 10 may issue a control signal for invoking the product information stored in the memory device 50 and allowing the conversion device 60 to convert the control signal into a acoustic signal. Also, as the signal output command is input from the selection device 22, the controller 10 controls the output device 70 to operate.

In addition, the controller 10 may set a dead time for the control signal. At this time, the controller 10 may set an interval during which a data value of the product information changes.

Here, as described above, the product information may include operation information containing operational settings, an operating condition during operation, etc., and fault information about a malfunction. The product information is data consisting of a combination of 0 and 1, which is a digital signal readable by the controller 10.

The controller 10 classifies data of this product information, configures the product information so as to contain specific data, divides the product information into given data sizes or adds the product information to generate a control signal of a specified standard and apply it to the conversion device 60.

Also, when one symbol represents one data bit, the controller 10 may interpose a dad time between symbols and generate a control signal.

At this time, the controller 10 may set a dead time corresponding to the size of a symbol time, which is a unit time during which the product information has one data value. For example, the controller 10 may set the dead time not to exceed 20% of the symbol time.

Figure 3:
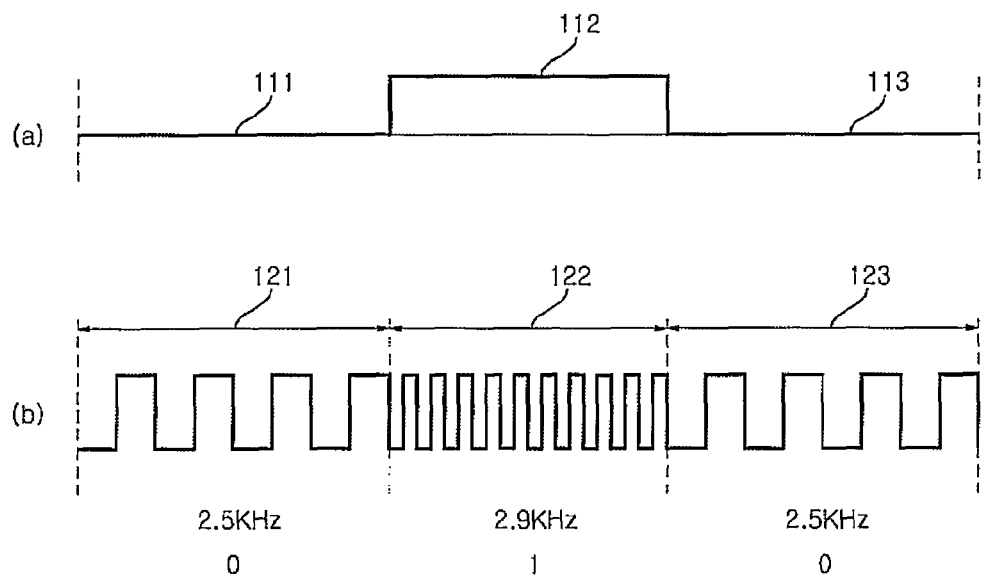
FIG. 3 is an illustration of a signal waveform during signal conversion of a home appliance in the form of a laundry treatment machine according to an embodiment.
Figure 4:
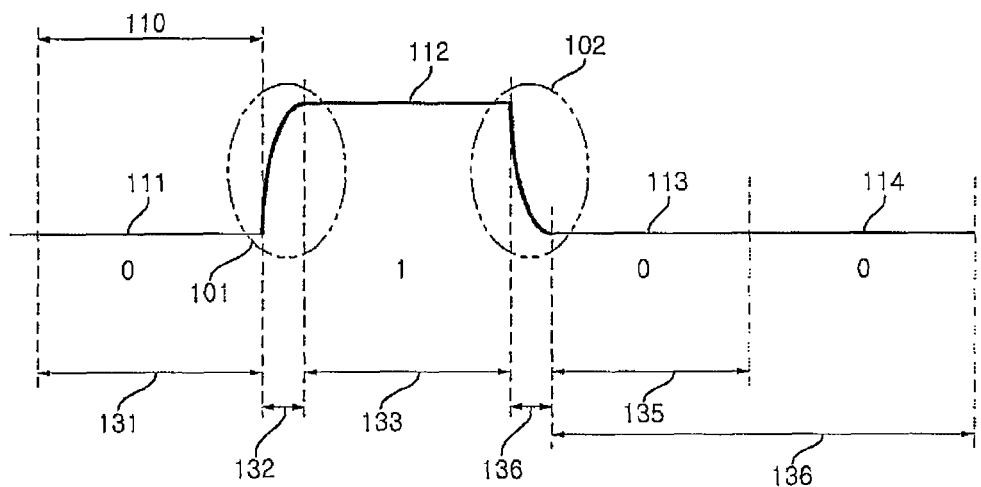
FIG. 4 is an illustration of conversion of a control signal into an acoustic signal in the home appliance of FIG. 3.

Here, the dead time is for eliminating a reverberation effect by which data bits of the previous symbol time affects the next symbol time in representing new data hits when one symbol time is over and the next symbol time starts on the principle of charging and discharge of capacitors as shown in FIGS. 3 and 4 to be described later.

The controller 10 may set an interval during which a data value of the product information change from 0 to 1 or from 1 to 0 as a dead time and generate a control signal.

The conversion device 60 may convert the control signal containing the product information into a acoustic signal for sound output. Here, the conversion device 60 may convert the control signal, which is a digital signal, into an analog signal of a predetermined frequency band, that is to say, convert the control signal into an acoustic signal by using any one of frequency shift keying method, amplitude shift keying method, and phase shift keying method at the time of signal conversion.

In the case of the frequency shift keying method, one example is Binary Frequency Shift Keying (hereinafter, BFSK). Using this method, if a value of data of the product information is 0, the product information may be modulated onto a signal having a first frequency, and if a value of data is 1, the product information may be modulated onto a signal having a second frequency. For example, if a data value is 0, the product information may be modulated onto a signal having a frequency of approximately 2.5 KHz, and if a data value is 1, the product information may be modulated onto a frequency of approximately 2.9 KHz.

In the case of the amplitude shift keying method, the product information may be modulated onto a signal having a frequency of approximately 2.5 KHz. More specifically, if a value of the data of the product information is 0, the product information may be modulated onto a signal having a frequency of approximately 2.5 KHz whose amplitude is 1, and if a value of the data of the product information is 1, the product information may be modulated onto a signal having a frequency of approximately 2.5 KHz whose amplitude is 2.

The conversion device 60 may stop signal conversion in an interval during which a dead time is set. That is, when converting a control signal into the acoustic signal by pulse width modulation (PWM), the conversion device 60 temporarily stops frequency signal conversion during the dead time by turning off the resonance frequency for modulation in an interval during which the dead time is set. The conversion device 60 may convert the product information into a signal of a predetermined frequency band according to the above-described methods, and output an acoustic signal by combining respective converted signals.

The acoustic signal is data into which a control signal containing the product information is converted by the conversion device 60, which is a signal for operating the output device 70 and outputting a predetermined sound to the output device 70.

The operation of the output device 70 is turned on and off by a control command from the controller 10, and receives an acoustic signal output from the conversion device 60 and outputs a predetermined sound. At this time, means for outputting sound, such as a speaker and buzzer, can be used as the output device 70.

The output device 70 may stop its operation upon finishing outputting after it outputs an acoustic signal as a predetermined sound. If a signal output command is inputted by the selection device 22, the output device 70 is operated again to output a predetermined sound.

A buzzer with a narrow reproduction frequency band or a speaker with a broad reproduction frequency band may be used as the output device 70. While the speaker has a broad reproduction frequency band, has a large volume, is expensive, and requires a large waste of frequency band, the buzzer has a narrow reproduction frequency band, is cheap, and has almost no waste of reproduction frequency band. Unless the output device 70 generates a human voice or generates an effect sound requiring a wide frequency band, it is reasonable that the output device 70 is comprised of a buzzer rather than a speaker.

Hereinafter, the output device 70 may refer to a buzzer, and generate an acoustic corresponding to status information or fault information of the home appliance.

In response to a control signal from the controller 10 of the display device 40, information input by the selection device 22 and the manipulation device 21, operational state information of the home appliance 1, and information of the completion of the operation of the home appliance are displayed on the screen. Also, fault information about a malfunction of the home appliance is displayed on the screen upon malfunctioning of the home appliance.

At this time, the home appliance may further comprise a lamp lighting or flickering, a vibrating device, and so on. A description thereof will be omitted below.

The thus-configured home appliance 1 may output a predetermined sound, and as described below, transmit product information of the home appliance 1 to the service center 90.

The service center 90 comprises a user interface 93, a decoder 91, and a diagnosis device 92.

The user interface 93 may provide a predetermined interface on which the manager of the service center, the user, and the service personnel can check diagnosis results and the progress of diagnosis, and receives or outputs data.

The user interface 93 comprises input means such as buttons, keys, a touch pad, and a switch that are manipulated by the user, and display means for outputting operational information of a diagnosis server and diagnosis results. Further, the input/output device 270 comprises a connection interface for an external input device and portable memory device means.

When the input means is manipulated, the user interface 93 may allow a predetermined sound output from the home appliance 1 of the user to be applied to the decoder 91 through a telephone network or a mobile communication network, thus enabling the diagnosis device 92 to execute diagnosis.

When the sound containing the product information of the home appliance is received through the telephone network or mobile communication network, the decoder 91 may convert the sound and apply it to the diagnosis device 92. At this time, the decoder 93 may acquire a control signal containing the product information by analog digital conversion and frequency conversion of the input sound of the home appliance.

The decoder 91 may acquire the control signal containing the product information of the home appliance 1 and apply it to the diagnosis device 92.

As a means of inverse conversion of the signal conversion in the home appliance 1, it is preferred that the decoder 91 converts data through the same signal conversion system as an individual home appliance. The decoder 91 may convert the sound, which is an analog signal of a predetermined frequency band, into a digital signal through inverse conversion using any one of frequency shift keying, amplitude shift keying, and phase shift keying.

The diagnosis device 92 may diagnose an operating condition of the home appliance 1 and the presence or absence of a fault by analyzing the control signal input from the decoder 91. The diagnosis device 92 comprises a diagnosis program for analyzing a control signal and diagnosing a home appliance according to the analysis of product information contained in the control signal, and the diagnosis program contains diagnosis data.

In addition, upon occurrence of a fault, the diagnosis device 92 may analyze the cause of the fault and generate a diagnosis result to work out a solution or a service plan, and applies it to the user interface 93.

The diagnosis result of the diagnosis device 92 is output through the user interface 93, and therefore the service center 90 transmits the solution to resolve the malfunction of the home appliance 1 to the user or sends service personnel.

Now, an example of converting product information into an acoustic signal by the conversion device 60 of the home appliance 1 will be described.

FIG. 3 is an illustration of a signal waveform during signal conversion of a home appliance in the form of a laundry treatment machine according to an embodiment. Referring to FIG. 3, the home appliance 1 may store product information containing at least one of data consisting of a combination of 0 and 1 which is associated with operational information and fault information. The following description will be given of an example in which the conversion device 60 converts a signal according to the BFSK method.

FIG. 3(*a*) is a view showing product information, and FIG. 3(*b*) is a converted acoustic signal. To assist in the understanding of the invention, a signal is represented as a pulse signal of a square waveform.

As shown in FIG. 3(*a*), if the product information is 010, in the case of conversion according to the BFSK, the conversion device 60 converts the product information into a signal 121 having a frequency of 2.5 KHz when a data value in a first symbol time 111 is 0, and converts the product information into a signal 122 having a frequency of 2.9 KHz when a data value in a second symbol time 112 is 1.

FIG. 4 is an illustration of conversion of a control signal into an acoustic signal in the home appliance of FIG. 3. As shown in FIG. 4, intervals 101 and 102 during which the data value changes are generated for each symbol time 110 are generated in the product information. The controller 10 may set a dead time in the intervals 101 and 102 during which the value changes. Here, the controller 10 may set the intervals of the dead times 101 and 102 not to exceed 20% of the symbol time 110.

The conversion device 60 converts a signal as shown in the above-described FIG. 3, and stops signal conversion by turning off the resonance frequency for frequency conversion in the intervals where the dead times 101 and 102 are set.

This is because a signal not required for an acoustic signal may be added since two frequencies may appear in the intervals during which the data value changes in the procedure of the signal conversion, or because the effect of converting one frequency signal into another frequency signal may remain and continue even after a specified amount of time in the procedure of the data value change. Therefore, the signal conversion is stopped during changing of the data value.

Accordingly, the product information is converted into a signal having a frequency of 2.5 KHz in response to a data value of 0 during a first interval 131, signal conversion is stopped during a second interval 132 where the dead time 101 is set, and the product information is converted into a signal having a frequency of 2.9 KHz in response to the data value of 0 during a third interval 133.

Afterwards, signal conversion is stopped during a fourth interval 134 where the dead time 102 is set, and the product information is converted into a signal of 2.5 KHz in response to the data value of 0 during a fifth interval 135. Here, after the fifth interval 135, no dead time is set because the data value does not change for the next symbol time, and the product information is converted into a signal having a frequency of 2.9 KHz during a sixth interval 136.

Here, the frequencies used are only an example and not limited thereto, and may be changed into other frequencies within the human audible frequency range. Also, different conversion methods may be used.

Figure 5:
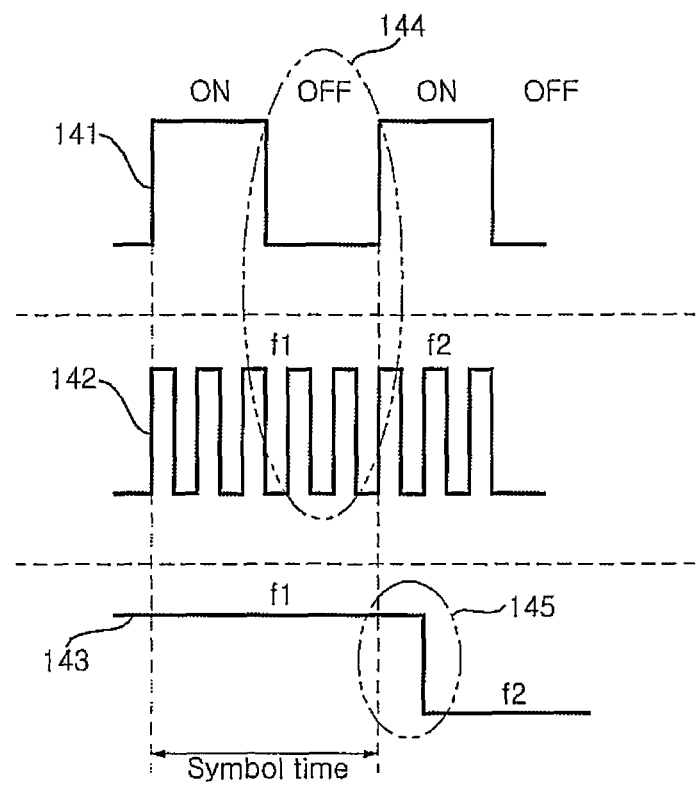
FIG. 5 is an illustration of a signal form when a control signal is converted into an acoustic signal without a dead time in the home appliance of FIG. 4.
Figure 5:
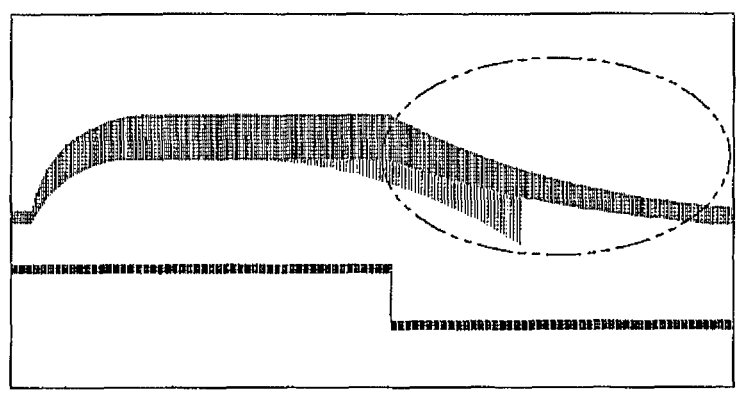

FIG. 5 is an illustration of a signal form when a control signal is converted into an acoustic signal without a dead time in the home appliance of FIG. 4. At the time of converting a control signal of 010 into an acoustic signal as shown in the above-described FIG. 5(*a*), if the control signal is converted into an acoustic signal without a dead time, a resonance frequency 142, along with a synchronization signal 141 for synchronization during signal conversion, is generated in the conversion device 60 according to PWM. By using these, the conversion device 60 converts the control signal into an acoustic signal by frequency conversion 143. The acoustic signal is represented by a spectrum for convenience.

That is, in the case that the control signal is converted into an acoustic signal without a dead time as seen from above, data bits of the first symbol time of the converted signal 143 of FIG. 5 shift to the next symbol time.

Therefore, a waveform as shown in FIG. 5(*a*) is shown.

This applies even when signal conversion is performed in the service center, as well as when sound is output from the home appliance 1, and affects the next symbol cue to reverberation of the intervals where data bits change. In the case that the decoder 91 of the service center inversely converts a signal, if the next symbol is affected by the reverberation of the signal, this makes correct data extraction difficult.

Figure 6:
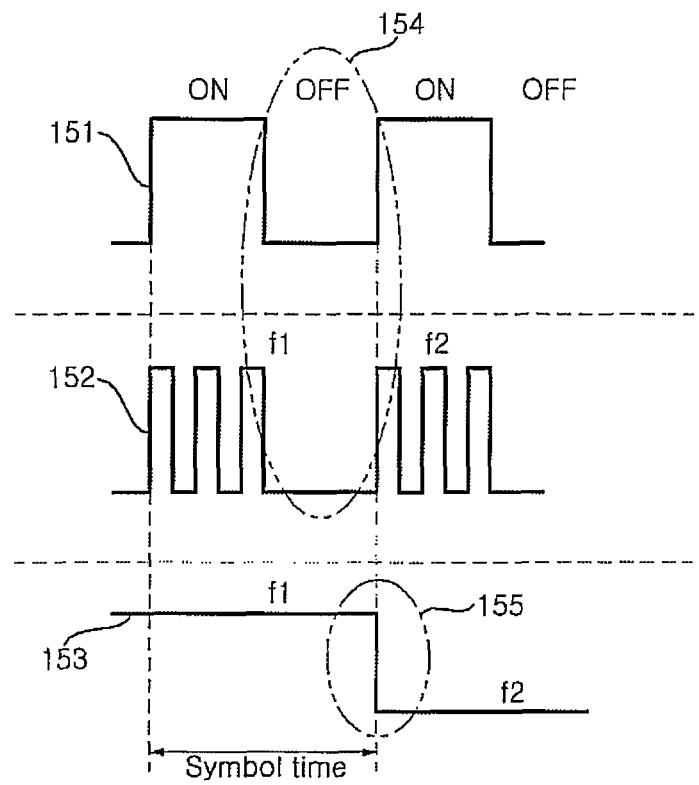
FIG. 6 is an illustration of a signal form when a control signal is converted into an acoustic signal by the use of a dead time in the home appliance of FIG. 4.
Figure 6:
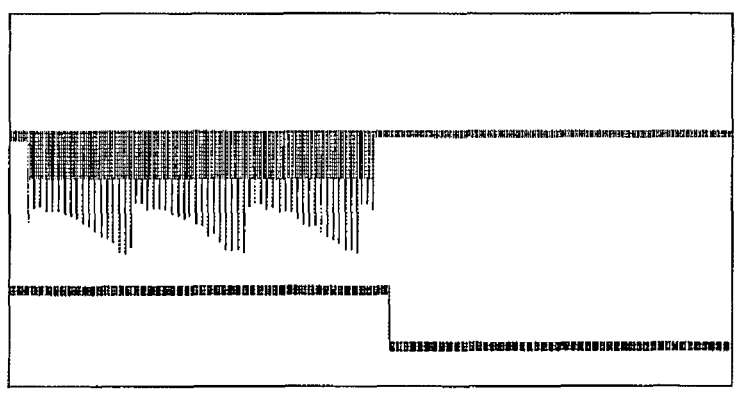

FIG. 6 is an illustration of a signal form when a control signal is converted into an acoustic signal by the use of a dead time in the home appliance of FIG. 4.

When converting a signal by using the synchronization signal 151 and the resonance frequency 152, the conversion device 60 stops the resonance frequency generated according to PWM during an interval where a dead time is set in response to a control signal from the controller 10.

As shown in FIG. 6(*a*), when the resonance frequency is turned off during the dead time interval, a converted acoustic signal is generated in a specified symbol time interval. The acoustic signal is represented as a spectrum signal for convenience.

If the control signal having a dead time set therein is converted into an acoustic signal as described above, the signal is converted and generated into a given symbol time size as shown in FIG. 6(*b*).

The thus-generated acoustic signal is applied to the output device 70 and output as a predetermined sound.

At this time, the control signal and the symbol time of the acoustic signal are determined as follows.

Figure 7:
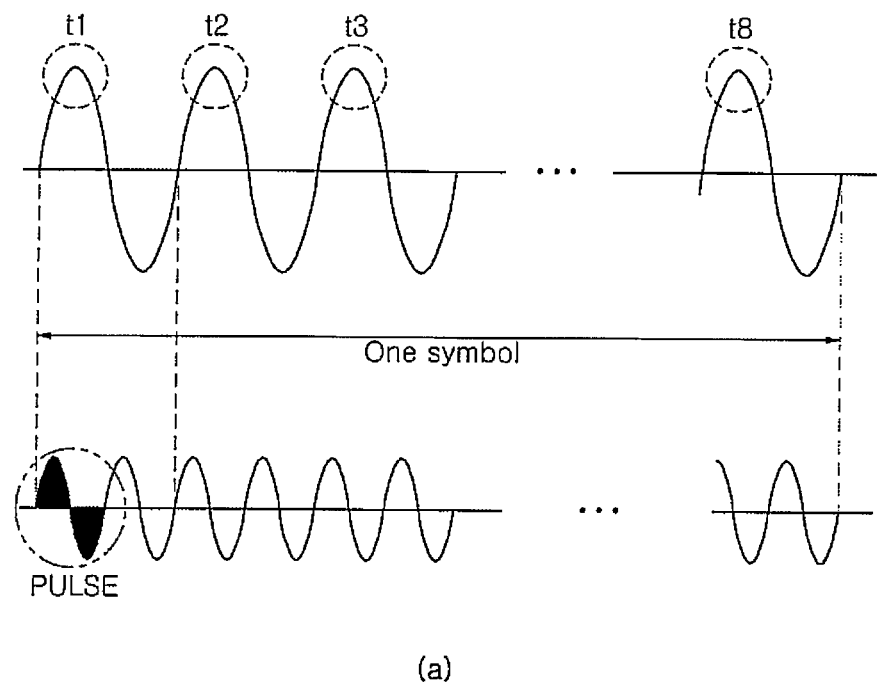
FIG. 7 is an illustration of a symbol time setting when a control signal is converted into an acoustic signal in the home appliance of FIG. 3.
Figure 7:
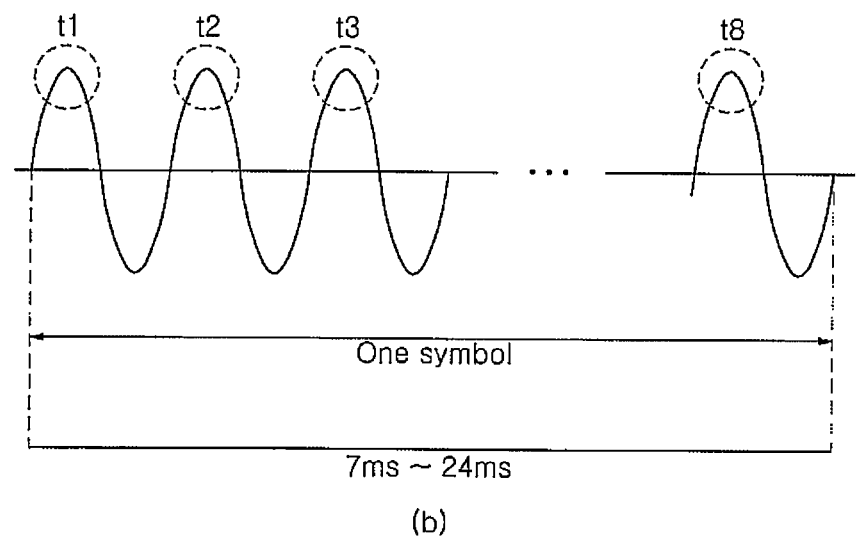

FIG. 7 is an illustration of a symbol time setting when a control signal is converted into an acoustic signal in the home appliance of FIG. 3. FIG. 7(a) conceptually shows the structure of the acoustic signal. Referring to FIG. 7(a), the acoustic signal applied to the output device 70 consists of two frequency components.

In an example where a buzzer is used as the output device 70, if it is assumed that a reproduction frequency band of the buzzer ranges from 2.5 KHz to 3 KHz, the acoustic signal may be implemented as a symbol consisting of a pulse of 2.6 KHz and a pulse of 2.8 KHz.

At this point, the acoustic signal generated from the conversion device 60 uses the two frequency components of 2.6 KHz and 2.8 KHz, and 2. KHz corresponds to a logic '0' and 2.8 KHz corresponds to a logic '1'.

If the reproduction frequency band of the output device 70 is higher or lower than these frequencies, it is natural that the frequency of the pulses constituting the acoustic signal also may be higher or lower than these frequencies. However, the use of high and low frequency bands respectively corresponding to a logic '1' and a logic '0' (otherwise, a logic '0' and a logic '1'), applies in the same way to the reproduction frequency band of the buzzer because the reproduction frequency band of the buzzer is very restricted, Here, a symbol is one data bit and corresponds to one logic level, each symbol consists of a plurality of pulses, and the cycle of each pulse is determined according to the two frequencies.

In a case where the home appliance 1 outputs an acoustic signal by sound and transmits it through a telephone network or mobile communication network, the data transmission rate varies according to the size of a symbol. If a symbol time is 30 ms, about 30 seconds are required to transmit data of 100 bytes.

Thus, in order to increase the transmission rate, the size of a symbol and a symbol have to be reduced, that is, the number of pulses per symbol in each frequency signal is reduced.

If the number of pulses per symbol is reduced, when each symbol is reproduced at an audible frequency band, the reproduction time is shortened and hence the output device 70 may not be able to output a correct sound. Moreover, even if sound is output, signal attenuation or signal distortion may occur in the procedure of transmitting the sound through a telephone network or mobile communication network, and this can make it impossible for the service center 90 to perform diagnosis of the home appliance using sound or lead to a wrong diagnosis.

Subsequently, the present invention enables the outputting and transmission of a correct sound, as well as reducing the data size of the sound and the transmission rate, by determining the number of pulses constituting one symbol.

In response to the symbol size and symbol time of a control signal applied to the conversion device 60 from the controller 10, the number of pulses to be included per symbol in an acoustic signal output from the conversion device 60 is determined. Data transmission capability of sound output from the output device 70 is determined according to the number of pulses in a symbol.

Also, it is determined how short the cycle of pulses per symbol is according to the frequency components used in the procedure of conversion of the control signal into the acoustic signal in the conversion device 60.

If the symbol time decreases, a period of time for which a symbol is reproduced in the output device 70 is extremely shortened, and this may cause the aforementioned problem of the output and recognition of sound. On the contrary, if the number of pulses per symbol and the symbol size are increased, this makes recognition easier but production information contained in the sound increases the transmission time of the output sound. Therefore, the symbol size, that is, the symbol time is determined within a recognizable range according to the characteristics of the telephone, mobile terminal, telephone network, and mobile communication network that are used.

The cycle of pulses constituting a symbol is determined according to the reproduction frequency band, for example, 2.6 KHz and 2.8 KHz, of the output device. Thus, the number of pulses arranged in the same time interval is equal. At this time, since a mobile terminal 5 receiving an acoustic signal of an audible frequency band performs sampling after reception of the acoustic signal, the symbol size cannot be reduced to below a certain level.

the symbol time is defined such that the number of pulses per symbol should be 8 to 32 with respect to an acoustic signal converted in the conversion device 60.

One symbol consisting of 8 to 32 pulses comes up with few errors and can achieve the highest transmission rate when the home appliance 1 transmits data to the mobile terminal 5 by means of an acoustic signal.

FIG. 7(b) illustrates a detailed structure of a symbol of the acoustic signal converted in response to the control.

If the symbol cycle is less than 7 ms, the mobile terminal may not be able to properly acquire a reproduced sound of the buzzer 72 and hence cause a recognition error. If the symbol cycle exceeds 24 ms, the transmission rate of the acoustic signal transmitted to the mobile terminal 5 from the home appliance 1 is reduced.

Figure 8:
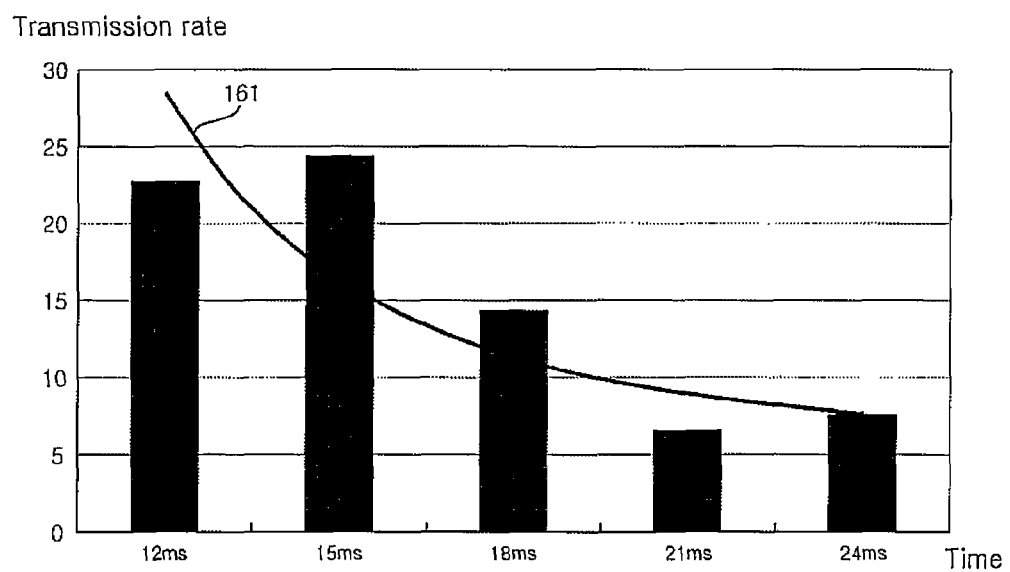
FIG. 8 is an illustration of the relationship between transmission rate and error rate with changes in the size of a symbol time in the home appliance of FIG. 7.

FIG. 8 is an illustration of the relationship between transmission rate and error rate with changes in the size of a symbol time in the home appliance of FIG. 7. The transmission rate varies according to the size of a symbol time of the control signal and acoustic signal, and FIG. 8 illustrates a transmission rate per symbol time with respect to an error rate 161 of below 30 bits per 1216 bits. The horizontal axis represents the symbol time, and the longitudinal axis represents the transmission rate, and the inversely proportional curve represents the error rate.

The longer the symbol time, the grater the size of data to be transmitted, and hence the transmission time varies and the transmission error also varies according to an increase in transmission time.

In the case of performing a test by using a mobile terminal, if the symbol time is varied from 12 ms to 30 ms while satisfying an error rate of below 20/1216 bits, the transmission rate is varied as shown in FIG. 8.

The transmission rate is the highest, i.e., about 24, at a symbol time of 15 ms, but the error rate is over 30/1216 bits, thus failing to satisfy the error rate condition.

It can be seen that the transmission rate is very low, i.e, 7 and 8, at symbol times of 21 ms and 24 ms, respectively.

Although the transmission rate is high at symbol times of 12 ms and 15 ms, the error rate is high at 15 ms as described above. Thus, it is preferred to set the symbol time to 12 ms at which the transmission rate is high.

A method of performing signal conversion and signal output by setting symbol times and setting dead times between the symbol times will now be described.

Figure 9:
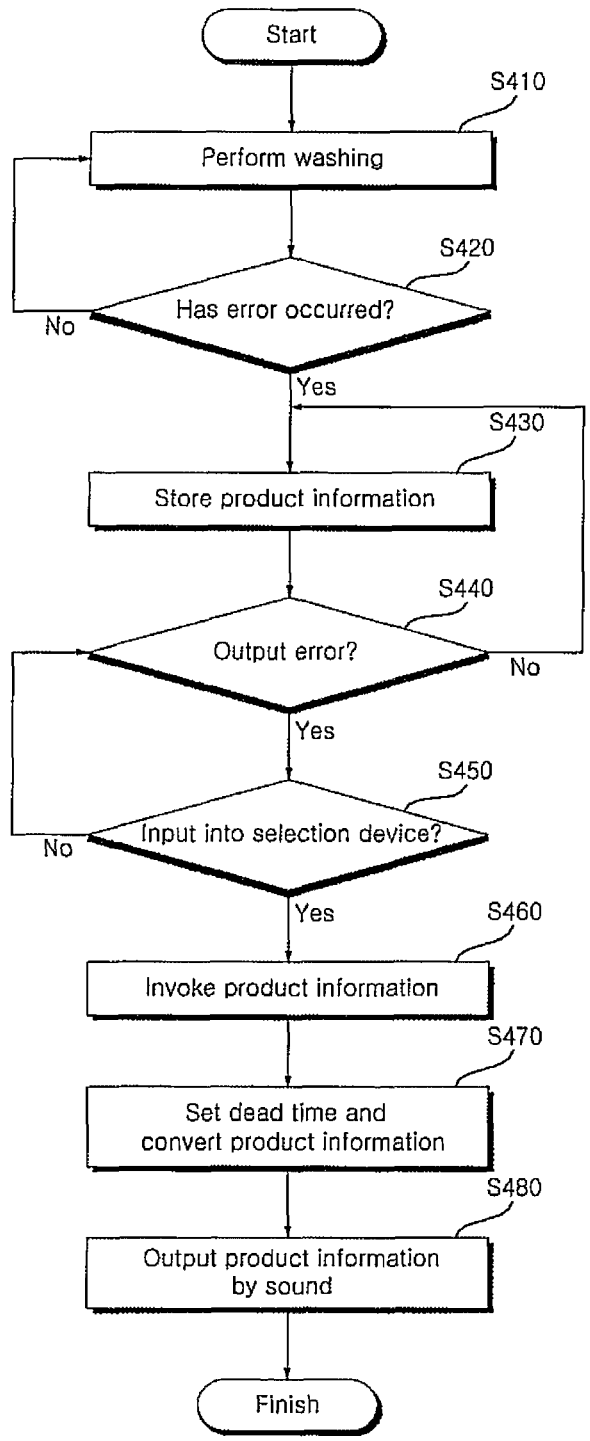
FIG. 9 is a flowchart of a signal output method of a home appliance according to one exemplary embodiment of the present invention.

FIG. 9 is a flowchart of a signal output method of a home appliance according to one exemplary embodiment of the present invention. The following description will be given by taking a laundry treatment machine as an example.

Referring to FIG. 9, the laundry treatment machine performs washing according to settings input through the manipulation device 21 (S410). Setting information about the operation of the laundry treatment machine is stored as operational information.

When an error occurs during operation (S420), the controller 10 stores error occurrence information according to the malfunction as fault information. Here, the fault information and the operational information are stored as product information in the memory device 50 (S430).

The controller 10 outputs the occurred error through the display device 40. When access to a smart diagnosis mode is selected and input through the selection device 22 (S450), product information containing the fault information and the operational information is invoked from the memory device 50 (S460), and generates the product information as a control signal of a predetermined standard.

The controller 10 applies the generated control signal to the conversion device 60, and also applies a control command to the output device 70 so as to operate the output device 70.

At this time, the controller 10 may set a dead time between intervals during which a data value of the product information changes, that is, the intervals between symbols, and the conversion device 60 converts the control signal containing the product information into an acoustic signal of a predetermined frequency band by taking the set dead time into account.

The output device 70 receives an input of the acoustic signal converted and output from the conversion device 60, and outputs a predetermined sound (S480).

Figure 10:
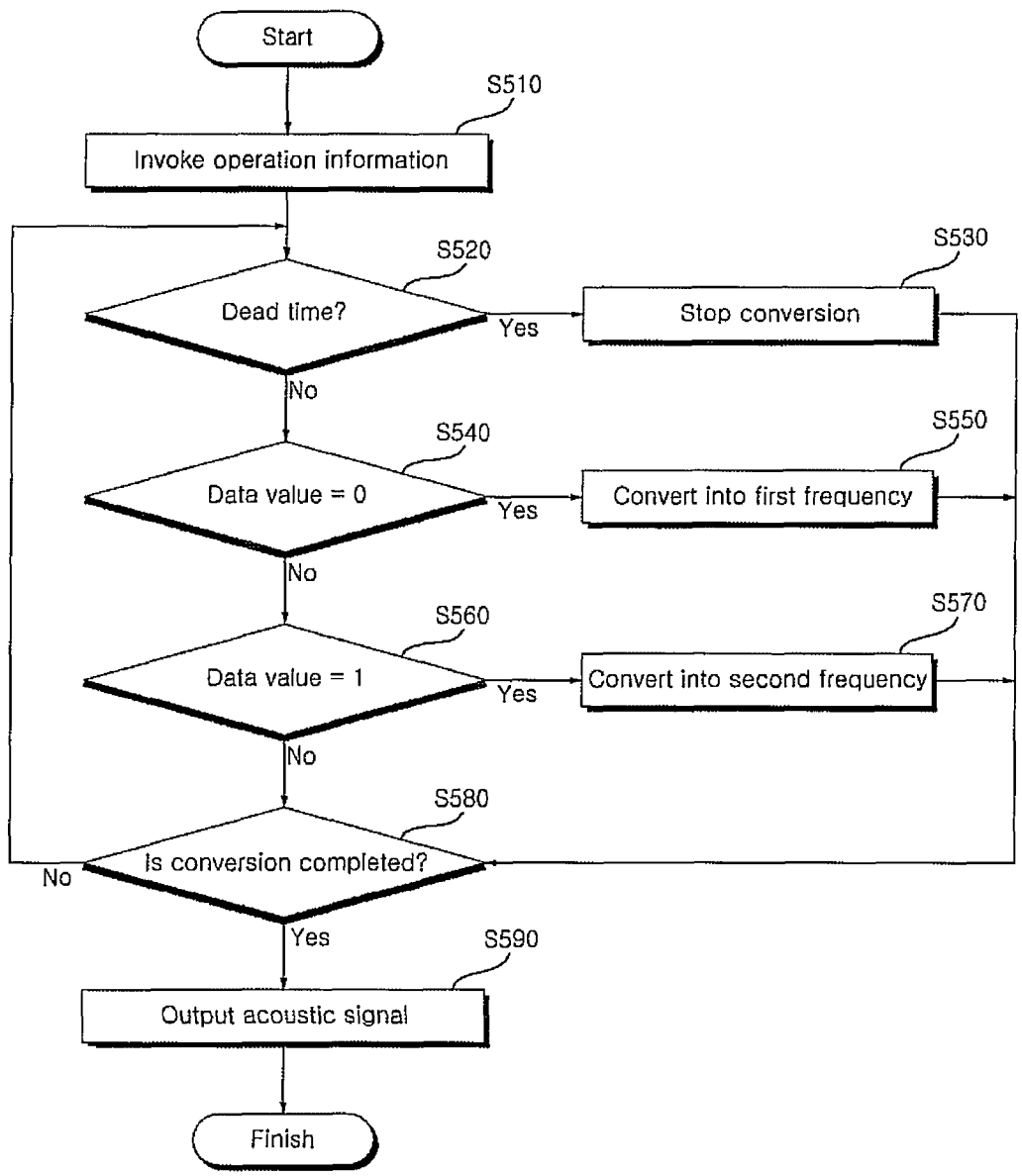
FIG. 10 is a flowchart of a signal conversion method of a home appliance according to one exemplary embodiment of the present invention.

FIG. 10 is a flowchart of a signal conversion method of a home appliance according to one exemplary embodiment of the present invention.

A procedure of generating a control signal containing product information, converting the control signal into an acoustic signal, and outputting sound when the laundry treatment machine outputs a predetermined sound as above will be described below. It should be noted that the following description will focus on an example in which the conversion device 60 converts a signal according to a frequency shift keying method but is not limited thereto.

Referring to FIG. 10, when the product information is invoked from the memory device 50 (S510), the controller 10 may set a dead time in response to a data value of the product information.

The controller 10 divides the product information into given data sizes or adds the product information and may set a dead time between symbols to generate a control signal of a predetermined standard.

At this time, the conversion device 60 converts the control signal into an acoustic signal of a predetermined frequency band. In an interval of the control signal during which a dead time is set (S520), signal conversion is temporarily stopped (S530). After the dead time interval, signal conversion is started again.

If a data value of the control signal is 0 (S540), the conversion device 60 converts the control signal into a signal of a first frequency (S550), and the data value is 1 (S560), the conversion device 60 converts the control signal into a signal of a second frequency (S570). That is, if the data value is 0, the conversion device 60 converts the control signal into a signal having a frequency of 2.5 KHz, and the data value is 1, the conversion device 60 converts the control signal into a signal having a frequency of 2.9 KHz. At this time, in a dead time interval during which the data value changes, the signal conversion is temporarily stopped.

At this time, a resonance frequency signal generated according to PWM is turned off to stop signal conversion during the dead time interval. When the resonance frequency is turned off during the dead time interval, an acoustic signal is formed in the symbol time even if there is an effect of a reverberation signal according to the characteristics of a capacitor as shown in the above-described FIGS. 5 and 6.

Here, at the time of signal conversion, the conversion device 60 converts a signal in units of symbol times with respect to a symbol time, which is a unit time during which the product information has one data value.

By executing signal conversion at symbol time intervals as described above (S520 to S570), when the signal conversion of the product information is completed (S580), each signal converted at the symbol time intervals is output as an acoustic signal.

The output device 70 receives an input of the acoustic signal output from the conversion device 60, and outputs it, thereby outputting a predetermined sound (S590).

Accordingly, the user will hear the sound containing the product information of the laundry treatment machine, and this sound is transmitted to the service center through a connected communication network as seen in the above-described FIGS. 1 and 2.

Consequently, in converting product information containing fault information generated during operation of the home appliance or operational information such as setting information for operation of the home appliance into a predetermined sound and outputting it, the home appliance and its signal output method according to the present invention is configured such that signal conversion is stopped during a dead time interval by setting a dead time between symbols of a control signal containing product information, thereby preventing signal noise and distortion during an interval where a data value changes and enabling an efficient signal processing.

Furthermore, in generating a control signal, a symbol time is set in consideration of the number of pulses per symbol in an acoustic signal, thereby enabling stable sound output and transmission and improving transmission rate.

As described above, the home appliance system and the operation method thereof according to the present invention have been described with reference to the illustrated drawings. However, the present invention is not limited to the embodiments and drawings disclosed in the present specification, but may be applied by those skilled in the art without departing from the scope and spirit of the present invention.

What is claimed is:

1. A home appliance that transmits product information to a management device via a communication network for fault diagnosis of the home appliance, the home appliance comprising:

a selection device that receives an input of an external command signal;

a storage device that stores the product information of the home appliance for the fault diagnosis;

a controller that, upon receipt of the external command signal through the selection device, loads the product information stored in the storage device and generates a control signal including the loaded product information as a sequence of symbols;

a conversion device that converts the control signal into a sequence of acoustic signals, each of the acoustic signals having any one of predetermined frequencies which are different from each other from signal to signal; and an output device that receives the sequence of the acoustic signals from the conversion device and outputs a sound corresponding to the sequence of the acoustic signals, wherein each of the acoustic signals corresponds to each of the symbols, and the controller controls signal conversion of the conversion device to be stopped during a dead time provided between adjacent symbols, and wherein the each of the symbols corresponds to 1 bit.

2. The home appliance of claim 1, wherein the controller controls the conversion device to set the dead time to be less than approximately 20% of a duration of the acoustic signals.

3. The home appliance of claim 1, wherein the controller controls the conversion device to set the dead time between a first symbol and a second symbol and wherein the dead time has a different logic value from the first symbol.

4. The home appliance of claim 1, wherein the controller controls the conversion device to set a cycle time of the each symbol within a range of approximately 7 ms to approximately 24 ms.

5. The home appliance of claim 4, wherein the cycle time of the each symbol is approximately 12 ms.

6. The home appliance of claim 1, wherein the each of the acoustic signals has 8 to 32 pulses.

7. The home appliance of claim 1, wherein the conversion device converts the control signal into the acoustic signals by generating a resonance frequency according to a pulse width modulation, and the resonance frequency is turned off during the dead time.

8. The home appliance of claim 1, wherein the conversion device converts the product information into a signal having a first frequency if a logic value of the control signal is 0, converts the product information into a signal having a second frequency if the logic value of the control signal is 1, and combines the converted signals of the first and second frequencies to output the acoustic signals.

9. The home appliance of claim 1, wherein the product information contains operation information and fault information of the home appliance.

10. The home appliance of claim 1, wherein the product information contains status information of the home appliance.

11. The home appliance of claim 1, wherein the conversion device converts the loaded product information into a signal having a first predetermined frequency if a logic value of the control signal is 0, converts the loaded product information into a signal having a second predetermined frequency if the logic value of the control signal is 1, and combines the converted signals of the first and second frequencies to output the sequence of the acoustic signals.

12. A diagnosis method of a home appliance, the diagnosis method comprising:
    storing product information of a home appliance;
    upon receipt, in the home appliance, of an external signal for diagnosis, loading the product information;
    generating a control signal including the loaded product information as a sequence of symbols, each of the symbols corresponds to 1 bit;
    converting the control signal into a sequence of acoustic signals, each of the acoustic signals having any one of predetermined frequencies which are different from each other from signal to signal; and
    outputting the sequence of the acoustic signals as a sound, wherein each of the acoustic signals corresponds to the each of the symbols, and wherein converting the control signal is stopped during a dead time provided between adjacent symbols.

13. The diagnosis method of claim 12, further comprising:
    receiving the sound by a service center through a communication network;
    inversely converting the received sound and extracting the product information of the home appliance from the received sound; and
    diagnosing a condition of the home appliance by analyzing the extracted product information.

14. The diagnosis method of claim 12, wherein, in the generation of the control signal, the loaded product information is converted by using any one of frequency shift keying, amplitude shift keying, and phase shift keying.

15. The diagnosis method of claim 12, wherein a cycle time of the each symbol is within a range of approximately 7 ms to approximately 24 ms.

16. The diagnosis method of claim 15, wherein the cycle time of the each symbol is approximately 12 ms.

17. The diagnosis method of claim 12, wherein a duration of the acoustic signals is set such that 8 to 32 pulses are contained per one symbol.

18. The diagnosis method of claim 12, wherein the product information contains operation information and fault information of the home appliance.

19. The diagnosis method of claim 12, wherein the product information contains status information of the home appliance.

20. A home appliance that transmits product information to a management device via a communication network for fault diagnosis of the home appliance, the home appliance comprising:
    a selection device that receives an input of an external command signal;
    a storage device that stores the product information of the home appliance for the fault diagnosis;
    a controller that, upon receipt of the external command signal through the selection device, loads the product information stored in the storage device and outputs a control signal including the loaded product information;
    a conversion device that converts the control signal into a sequence of acoustic signals, each of the acoustic signals having a predetermined frequency which is different from each other from signal to signal; and
    an output device that receives the sequence of the acoustic signals from the conversion device and outputs a sound corresponding to the sequence of the acoustic signals, wherein a dead time is provided between adjacent frequencies, and the controller controls signal conversion of the conversion device to be stopped during the dead time, and wherein the each of the acoustic signals corresponds to 1 bit.

21. A home appliance that transmits product information to a management device via a communication network for fault diagnosis of the home appliance, the home appliance comprising:
    a selection device that receives an input of an external command signal;
    a storage device that stores the product information of the home appliance for the fault diagnosis;
    a controller that, upon receipt of the external command signal through the selection device, loads the product information stored in the storage device and outputs a control signal including the loaded product information as a series of bits, each bit having a value of 0 or 1;
    a conversion device that converts the control signal into modulated output signals based on frequency, wherein adjacent bits of the modulated output signals are modulated based on a different frequency; and
    an output device that receives the modulated output signals from the conversion device and outputs a sound corresponding to the modulated output signals, wherein when adjacent bits of the modulated output signals have different bit values, the controller controls the conversion device such that a dead time is provided between the modulated output signals, wherein each of the modulated output signals corresponds to 1 bit of the product information.

* * * * *